United States Patent [19]

Palkes

[11] Patent Number: 4,548,162
[45] Date of Patent: Oct. 22, 1985

[54] SLAGGING HEAT RECOVERY UNIT WITH POTASSIUM SEED RECOVERY

[75] Inventor: Mark Palkes, Glastonbury, Conn.

[73] Assignee: Combustion Engineering, Inc., Windsor, Conn.

[21] Appl. No.: 663,296

[22] Filed: Oct. 22, 1984

[51] Int. Cl.⁴ .............................................. F22D 1/00
[52] U.S. Cl. .................................. 122/7 R; 122/6 A; 110/216
[58] Field of Search ............... 122/7 R, 7 A, 6 A, 32; 110/216

[56] References Cited

U.S. PATENT DOCUMENTS

| | | | |
|---|---|---|---|
| 4,153,012 | 5/1979 | Csathy et al. | 122/7 R |
| 4,248,604 | 2/1981 | Woldy et al. | 122/7 R X |
| 4,395,268 | 7/1983 | Zabelka | 122/6 A |
| 4,462,339 | 7/1984 | Jahnke et al. | 122/7 R |

Primary Examiner—Edward G. Favors
Attorney, Agent, or Firm—Troxell K. Snyder

[57] ABSTRACT

A two part heat recovery unit receives a high temperature gas mixture (2) in the lower, refractory-lined dwell furnace (4) wherein the gas is cooled to condense out liquid inert ash material. The cooled gas mixture exits the dwell furnace (4) vertically upward through a transistion duct (18) which includes a restricted throat (28). Additional ash and potassium seed compounds condensed from the gas mixture in the convective furnace (20) either form a loose flyash which exits the convective furnace (20) with the gas mixture via the backpass (24), or collect on the walls and heat transfer surfaces (22) of the furnace (20) as a liquid which runs downward toward the throat (28) and is there reentrained by the high velocity gas stream.

3 Claims, 2 Drawing Figures

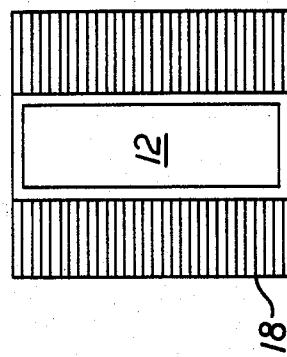
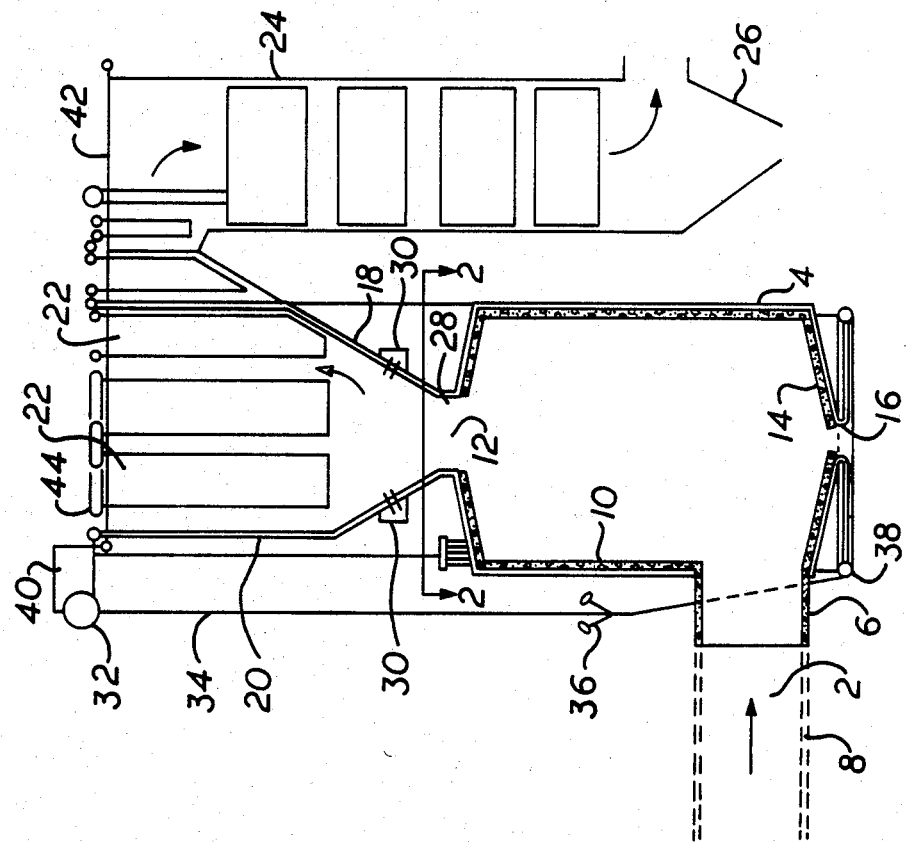

SLAGGING HEAT RECOVERY UNIT WITH POTASSIUM SEED RECOVERY

FIELD OF THE INVENTION

The present invention relates to a slagging furnace for cooling a high temperature gas mixture containing both vaporous inert ash material and vaporous potassium seed compounds, and more particularly to a slagging furnace wherein said inert ash material and said seed compounds are condensed and collected separately so as to improve the potential of the recovered seed compounds for recycling.

BACKGROUND OF THE INVENTION

Among the many possibilities for increasing the efficiency of the conversion of coal or other fossil fuels into electric power is open-cycle magnetohydrodynamic power generation (MHD). A typical open-cycle MHD system includes a combustor for generating a high velocity stream of high temperature, ionized gaseous products and a generating channel through which the high temperature gas mixture passes while being subjected to a strong magnetic field. The swift passage of the gaseous ions transversely through the magnetic field induces a flow of current in the gas which may be tapped by means of electrodes in the channel walls. Conversion efficiencies of 90% or better are theoretically possible in such an arrangement.

As the inducement of current flow is dependent upon the degree of ionization in the high temperature gas mixture, most proposed MHD systems specify the addition of a chemical "seed" such as potassium carbonate or potassium sulfate which functions to lower the mixture ionization temperature and thus augmenting the degree of ionization. Typical channel exit gas temperatures are in the range of 3800° to 3600° F. (2093° to 1982° C). As the amount of heat energy in the exiting gas mixture is still quite large, a heat recovery furnace is utilized downstream of the generating channel to recover the heat present in the gas mixture and to convert that heat into high pressure steam for use in driving a generating steam turbine.

Economic studies have shown that in order to successfully compete with less efficient, but simpler, power plant cycles utilizing coal as a fuel, an open cycle MHD generating station must effectively recycle the potassium seed material. There is currently a technological need for a waste heat recovery system that will facilitate condensation and recovery of the potassium seed compounds in a form which is amenable to recycling the recovered compounds to the high temperature coal combustor.

SUMMARY OF THE INVENTION

The present invention provides a furnace unit for recovering useful heat and potassium seed material from the exhaust gas stream of an MHD generating channel. Cooling and dwell times of the gas are managed within the unit according to the present invention to reduce the level of nitrogen oxides in the gas and to condense the gaseous potassium seed as a flyash for optimal recovery and eventual recycle to the high temperature MHD combustor.

Hot gas from the MHD channel is routed into the dwell furnace of the unit where it is cooled to a temperature less than the condensation temperature of the inert ash material carried over from the upstream high temperature converter. The cooled gas mixture, still containing gaseous potassium seed, is then ducted upward into a convection furnace through a transition section which includes a restricted flow area, or throat, for increasing gas velocity therethrough.

Inside the convective furnace, the mixture is further cooled, resulting in condensation and, eventually, solidification of the potassium seed compounds. The solidified seed is collected downstream of the unit for eventual recycling to the high temperature combustor.

It is an advantage of the heat recovery unit according to the present invention that the condensation of inert ash and the condensation of potassium seed each occur in separate furnaces, thus reducing the intermingling of these compounds which can reduce the recoverability of the valuable potassium seed.

It is also a feature of the heat recovery unit according to the present invention that any condensed liquid seed material collecting and running down the convective furnace walls or heat transmission surfaces will eventually flow into the restricted throat of the transition section and to be re-entrained in the high velocity. entering gas stream. This re-entrainment allows further cooling of the liquified slag, eventually forming solid particles which may be collected downstream for recycle to the combustor.

BRIEF DESCRIPTION OF THE DRAWING FIGURES

FIG. 1 shows a side elevation of the heat recovery unit according to the present invention.

FIG. 2 shows a sectional view of the transition duct as indicated in the preceding figure.

DESCRIPTION OF THE PREFERRED EMBODIMENT

A thorough discussion of the heat recovery unit according to the present invention will now be presented with reference to the drawing figures, and especially to FIG. 1 wherein a side sectional elevation of the preferred embodiment of the present invention is shown.

Coal-fired open cycle MHD power generation systems utilize a hot gas mixture which includes, besides the typical products generated during the combustion of the reactive portion of the coal fuel, at least some inert ash and a quantity of added seed compounds. At typical temperatures present at the exit of the MHD combustor, 4500° F. (2482° C.) or higher, both the inert ash material (primarily silica) and the potassium seed exist only in the vaporous state. Both the inert and seed materials remain gaseous at the exit of the channel, although a portion of the inert ash may be condensed on the cooled channel walls as a flowing liquid slag.

The apparatus and process for generating the high temperature, high speed ionized gas stream and generating electric power therefrom is well known to those skilled in the art of open cycle magnetohydrodynamic power generation. The basic concept originated in the pioneering work of Michael Faraday, with considerable refinement and adaptation occurring in the 1960's and 70's by various research laboratories and power equipment manufacturers. As the methods and apparatus used in the topping portion of the MHD cycle are not directly relevant to the subject matter of this application, no further discussion of this technical material will be presented herein. Further information may be had by reviewing articles and technical manuals available on the subject, such as the discussion presented in *Combustion, Fossil Power Systems*, pages 24-28 to 24-34, Combustion Engineering, Inc., 1981.

The hot gas exiting the MHD generating channel, having a temperature in the range of 3600° F. (1982° C.) to 3900° F. (2148° C.), still retains a great deal of heat energy which may be usefully converted into high pressure steam and hence electric power. It is to a waste heat recovery unit such as that of the present invention that this high temperature gas mixture would be routed for such steam production.

A typical gas composition for the gas mixture entering the dwell furnace appears in the Table below. This analysis was developed by theoretically reacting a typical dried coal with 90% of the quantity of air necessary to completely oxidize the combustible coal components. The analysis also assuaes that 90% of the coal ash has been removed prior to the gas stream entering the waste heat recover.y unit, and that potassium containing compounds have been added to enhance the hot gas ionization level. Each of the tabulated values will therefore change should a different coal be substituted as fuel. What will not change is the fact that any open cycle MHD generation system using coal as a fuel will generate a hot gas stream having sufficient heat energy for useful conversion, will contain vaporous potassium seed compounds which must be condensed, collected, and recycled to the combustor for economic reasons, and will also contain vaporous inert ash material which will condense as the hot gas mixture is cooled and which must therefore be removed from the gas stream for disposal.

TABLE

EQUILIBRIUM CHANNEL EXIT GAS COMPOSITION

| Compound | Weight Fraction |
|---|---|
| $CO_2$ | 0.3047 |
| CO | 0.0559 |
| $N_2$ | 0.5270 |
| $H_2O$ | 0.0810 |
| $SO_2$ | 0.0035 |
| $K_2SO_4$ | 0.0220 |
| Inert Ash | 0.0059 |
| | 1.0000 |

Referring now to FIG. 1, the high temperature MHD gas mixture 2 enters the dwell furnace 4 of the waste heat recovery. unit according to the present invention through the dwell furnace entrance opening 6. The entrance opening 6 is connected to the MHD channel outlet (not shown) by a diffuser section 8 shown in phantom.

The dwell furnace 4 is a water-cooled chamber having a refractory lining 10 for withstanding the extreme temperatures present in the high temperature gas mixture 2. Although the refractory lining 10 does reduce the heat transfer between the water-cooled dwell chamber walls and the contained hot gas, sufficient cooling does take place to reduce the gas temperature to approximately 2850° F. (1566° C. prior to its exit through the dwell furnace exit opening 12.

The particular exit temperature of the cooled gas mixture has been chosen to be above the temperature of condensation of the vaporous potassium seed compounds, 2250° F. (1232° C.) but also within or below the temperature range in which the inert ash material condenses as a liquid slag, 2600°-3100° F. (1426°-1704° C.). A portion of the vaporous inert ash material present in the received gas 2 will therefore condense as a liquid slag upon the inner refractory 10 of the dwell chamber 4 and run downward under the influence of gravity. As can be seen in FIG. 1, the floor 14 of the dwell chamber 4 slopes to a central opening 16 through which the liquid slag is removed from the process.

The choice of the exit gas temperature of the slagging dwell furnace plays an important part in determining the efficiency of the recovery and recycle of the potassium seed material. Should seed and slag be allowed to condense simultaneously, the potassium seed dissolves into the slag in such a manner as to make the separation of the two materials very difficult.

This is to be contrasted with the result which occurs when vaporous seed and ash is condensed and solidified very quickly to form flyash like particles. A flyash combination of seed particles andinert ash particles as may be collected from the cooled gas mixture in an electrostatic precipitator or baghouse located downstream of the waste heat recovery unit can be easily separated into ash compounds and seed compounds by slurrying the collected flyash with water. The potassium, typically present as potassium sulfate, is readily soluble in water unlike the insoluble silica based ash compounds. The potassium solution, separated from the insoluble ash particles, may then be dried or otherwise processed into a form suitable for recycle to the high temperature combustor.

The waste heat recovery unit according to the present invention achieves this desirable second result by preventing the simultaneously liquid condensation and collection of the potassium seed material and inert ash. This separation is accomplished by the configuration of the transition section or duct 18 which conducts the gas mixture from the dwell furnace 4 into the convective furnace 20. The conductive furnace 20 is positioned directly above the dwell furnace 4 and contains a plurality of heat absorbing surfaces 22 located therewithin. These heat transfer surfaces 22, typically cooled by steam, quickly reduce the temperature of the gas mixture within the convection furnace 20 thus condensing and solidifying the seed material and any remaining vaporous ash into tiny particles of flyash which pass through the convection furnace and into the backpass region 24, eventually being collected in turning hopper 26 or in a downstream electrostatic precipitator or baghouse (not shown).

It must be noted at this point, that a significant portion of the remaining vaporous ash and seed material will condense upon the cooled walls and heat transfer surfaces of the convection furnace 20 as a comingled liquid slag which will run downward over the vertical surfaces under the influence of gravity. This liquid ash and slag mixture will attempt to reenter the dwell furnace 4 through the dwell furnace outlet opening 12. The present invention provides for a restriction, or throat, 28 located within the transition section 18 for creating a high velocity upward flow of gas therethrough. The velocity of the gas passing through the throat 28 is sufficient to prevent entry of the liquid seed and inert ash material into the dwell furnace 4, reentraining the condensed material in the upward flowing gas stream and carrying the entrained droplets upward into the convection furnace 20.

The reentrained droplets of inert ash material and potassium seed, again part of the gas stream entering the convection furnace 20, are further cooled to form flyash which carries over into the backpass 24 as described above. It should be recognized that a portion of the reentrained liquid does again adhere to the convection furnace walls and heat transfer surfaces 22 and run down to the throat 28 as a liquid slag. Eventually, during operation of the unit, a seed balance will be achieved such that the mass of seed and ash entering the convection furnace 20 equals the mass of seed and ash leaving as solidifed flyash particles in the gas stream.

The throat 28 of the transition duct 18 is more clearly shown in the sectional view of FIG. 2. The transition duct 18 can also be seen in FIGS. 1 and 2 to have a divergent cross section for providing at least partial recovery of the kinetic energy of the gas mixture passing through the throat 28.

The control of nitrogen oxide emissions to the environment is an important environmental consideration and must be addressed in open cycle MHD power generation. This need arises due to the combined effect of the use of ordinary air (containing 70% nitrogen as the oxidant and the high temperature of the MHD combustor, 5,000° F. (2760° C.) or higher. One leading method for nitrogen oxide control, and the one utilized in the preferred embodiment of the present invention, is to fire the MHD high temperature combustor at 90% of the airfuel stoichiometry thus producing a reducing gas containing a small amount of carbon monoxide as shown in the Table above. The nitrogen oxides produced in the high temperature substoichiometric combustor are unstable in the temperature range between 3300° and 2900° F. (1815° to 1593° C.).

The nitrogen oxides and carbon monoxide present at the exit of the MHD channel will, if held in this temperature range for sufficient time, will react to form carbon-dioxide and nitrogen molecules. Experimental and theoretical evidence has shown that two seconds would be enough time to permit sufficient decomposition of the nitrogen oxides present at the exit of the MHD generating channel. The dwell furnace 4 of the preferred embodiment of the present invention is thus sized to provide at least two seconds of residence time therewithin to accomplish this decomposition.

Although the oxygen bound to the nitrogen does react with a portion of the carbon monoxide present within the dwell furnace 4, carbon monoxide itself is a pollutant which must be eliminated prior to discharge into the environment. This is readily accomplished by adding sufficient oxidant to complete the combustion reaction at temperatures high enough to allow this reaction to occur. In the preferred embodiment of the present invention this oxidant addition is accomplished by secondary air nozzles 30 disposed in the transition duct 18 just above the restricted throat 28. By placing the secondary air ejection nozzles 30 in this location, good mixing of the oxidant and hot gas mixture is facilitated. The flow streams of oxidant will enter the high speed flow stream of gas transversely, thus inducing turbulence and facilitating the mixing of the oxidant and gas mixture. Following addition of the secondary oxidant, the gaseous products in the convection furnace 20 and backpass 24 contain a small percentage of unreacted oxygen, having been converted from a reducing gas to an oxidizing gas.

The dwell furnace and convective furnace of the heat recovery unit according to the present invention, although unusual in configuration, are constructed basically of water-cooled tubing as are most conventional steam generating furnaces. For a forced circulation steam generator, water from the steam drum 32 flows through downcomer 34 to the circulating pump 36. The pump 36 forces the water into the lower header 38 of the dwell furnace from which it flows generally upwardly through the waterwall tubes wherein the heat absorbed from the contained hot gases boils a portion of the circulating water into steam. The steam water mixture is collected at the top of the convective furnace 20 and routed back to the steam drum 32 for separation into water and steam. The main steam line 40 conducts the separated steam through the roof 42 of the heat recovery unit or into the superheater inlet headers 44 of the heat transfer surfaces 22. In this arrangement, the heat transfer surfaces 22 and unit roof 42 act as superheaters for the generated steam.

Both the advantages and features of the present invention discussed above, as well as others, will become apparent to one skilled in the art upon careful review of the preceding specification and the appended drawing figures. It should further be understood that the embodiment disclosed herein is presented as being, in applicant's opinion, the best mode for practicing the present invention, and should therefore be interpreted in an illustrative and not a limiting sense.

I claim:

1. A heat recovery unit for cooling a high temperature reducing gas mixture, said gas mixture including a first and a second gaseous species, each species being condensable at respective first and second condensation temperatures, comprising:
   a dwell furnace lined with water-cooled refractory for receiving said high temperature reducing gas mixture and for cooling the received gas mixture to an exit temperature both less than the first condensation temperature and greater than the second condensation temperature,
   a convection furnace for cooling the gas mixture exiting the dwell furnace to a temperature less than the second condensation temperature, the convection furnace being disposed above the dwell furnace and containing a plurality of heat transfer surfaces therewithin;
   a vertical transition duct, disposed between the dwell furnace and the convection furnace, for directing the flow of gas therebetween, the duct further including a restricted flow area portion for providing increased gas velocity therethrough, thereby preventing reentry of any condensed material into the dwell furnace from the convection furnace; and
   a secondary air nozzle, disposed within the transition duct, for supplying additional oxidant to the gas mixture entering the convection furnace.

2. The heat recovery unit of claim 1 wherein the dwell furnace has an internal volume sufficient to delay the passage of the hot gas mixture therethrough for approximately two seconds.

3. The heat recovery unit of claim 1, further comprising a particle separator, disposed in the gas outlet flowstream of the convection furnace, for removing any entrained condensed species therefrom.

* * * * *